United States Patent
Hirayama

(10) Patent No.: US 9,519,277 B2
(45) Date of Patent: Dec. 13, 2016

(54) ACTUATOR CONTROL APPARATUS

(71) Applicant: Semiconductor Components Industries, LLC, Phoenix, AZ (US)

(72) Inventor: Hideki Hirayama, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 998 days.

(21) Appl. No.: 13/747,111

(22) Filed: Jan. 22, 2013

(65) Prior Publication Data

US 2014/0207287 A1   Jul. 24, 2014

(51) Int. Cl.
*G05B 11/01* (2006.01)
*G05B 19/042* (2006.01)

(52) U.S. Cl.
CPC ................................. *G05B 19/042* (2013.01)

(58) Field of Classification Search
USPC ............... 318/560, 671, 554, 685, 486, 569, 594,318/600
See application file for complete search history.

(56) References Cited

U.S. PATENT DOCUMENTS

| | | | |
|---|---|---|---|
| 5,225,839 A * | 7/1993 | Okurowski | G01S 7/025 342/174 |
| 7,039,494 B2 * | 5/2006 | Otsuki | B25J 9/1623 318/560 |
| 7,119,511 B2 * | 10/2006 | Sri-Jayantha | G11B 7/08505 318/560 |
| 2010/0329665 A1 * | 12/2010 | Yamada | G03B 21/64 396/508 |

FOREIGN PATENT DOCUMENTS

JP       2009-063702 A       3/2009

* cited by examiner

*Primary Examiner* — Eduardo Colon Santana
*Assistant Examiner* — Iftekhar Mustafa
(74) *Attorney, Agent, or Firm* — Rennie William Dover

(57) ABSTRACT

An actuator control apparatus includes an analog-digital conversion circuit, a servo circuit, a sampling circuit, and a driving circuit. The analog-digital conversion circuit is configured to sample a position detection signal with a first sampling period, convert the sampled signal into a digital signal, and output the digital signal, the position detection signal outputted from a position sensor corresponding to a position of a control target. The servo circuit is configured to calculate a displacement amount, by which the control target is to be displaced by an actuator, and output first servo control data corresponding to the calculated displacement amount, based on the position detection signal converted into the digital signal. The sampling circuit is configured to linearly interpolate the first servo control data, and output second servo control data sampled with a second sampling period shorter than the first sampling period.

20 Claims, 11 Drawing Sheets

ACTUATOR CONTROL APPARATUS

BACKGROUND OF THE INVENTION

Field of the Invention

The present invention relates to an actuator control apparatus.

Description of the Related Art

In image pickup devices such as a digital still camera and a digital video camera, various mechanisms are controlled with feedforward control or feedback control. For example, in positional control of diaphragm blades for performing AE (Automatic Exposure) control, performing the feedback control has such an advantage that convergence time becomes shorter than that when the feedforward control is performed.

For example, FIG. 14 of Japanese Patent Application Laid-Open Publication No. 2009-63702 discloses an image pickup device that adjusts a light amount of inputted light by controlling an aperture area of an iris (lens diaphragm) using a servo mechanism. In such an image pickup device, a current position of the iris is detected using a hall sensor as a position sensor, and feedback control to adjust the duty cycle of a PWM (Pulse Width Modulation) signal for driving a motor is performed so that a hall value corresponding to the current position converges on that corresponding to a target position.

As such, a diaphragm position is detected using an output of a position sensor such as a hall sensor, thereby being able to perform positional control of a diaphragm mechanism (diaphragm blades) with the feedback control.

In the image pickup device in FIG. 14 of Japanese Patent Application Laid-Open Publication No. 2009-63702, the output signal of the hall sensor is converted into a digital signal by ADC (Analog-Digital Converter) and is subjected to digital signal processing.

However, in such feedback control that the positional control of a control target is made in accordance with a result of the digital signal processing, if the sampling frequency of ADC and/or the operation frequency of the digital signal processing circuit becomes a frequency equal to or smaller than twice the audible range (approximately equal to or smaller than 40 kHz), a driving noise of an actuator becomes audible. Thus, if such digital feedback control is applied to an image pickup device, the driving noise is recorded as sound while shooting video.

Whereas, if the ADC sampling frequency is further increased, speeding-up in the ADC itself and/or the digital signal processing circuit results in increase in circuit scale and/or power consumption.

SUMMARY OF THE INVENTION

An actuator control apparatus according to an aspect of the present invention, includes: an analog-digital conversion circuit configured to sample a position detection signal with a first sampling period, convert the sampled signal into a digital signal, and output the digital signal, the position detection signal outputted from a position sensor corresponding to a position of a control target; a servo circuit configured to calculate a displacement amount, by which the control target is to be displaced by an actuator, and output first servo control data corresponding to the calculated displacement amount, based on the position detection signal converted into the digital signal; a sampling circuit configured to linearly interpolate the first servo control data, and output second servo control data sampled with a second sampling period shorter than the first sampling period; and a driving circuit configured to drive the actuator in accordance with the second servo control data.

Other features of the present invention will become apparent from descriptions of this specification and of the accompanying drawings.

DETAILED DESCRIPTION OF THE INVENTION

At least the following details will become apparent from descriptions of this specification and of the accompanying drawings.

First Embodiment

Configuration of Actuator Control Apparatus

A configuration of an actuator control apparatus according to a first embodiment of the present invention will be described hereinafter referring to FIGS. 1 and 2.

Figure 1:
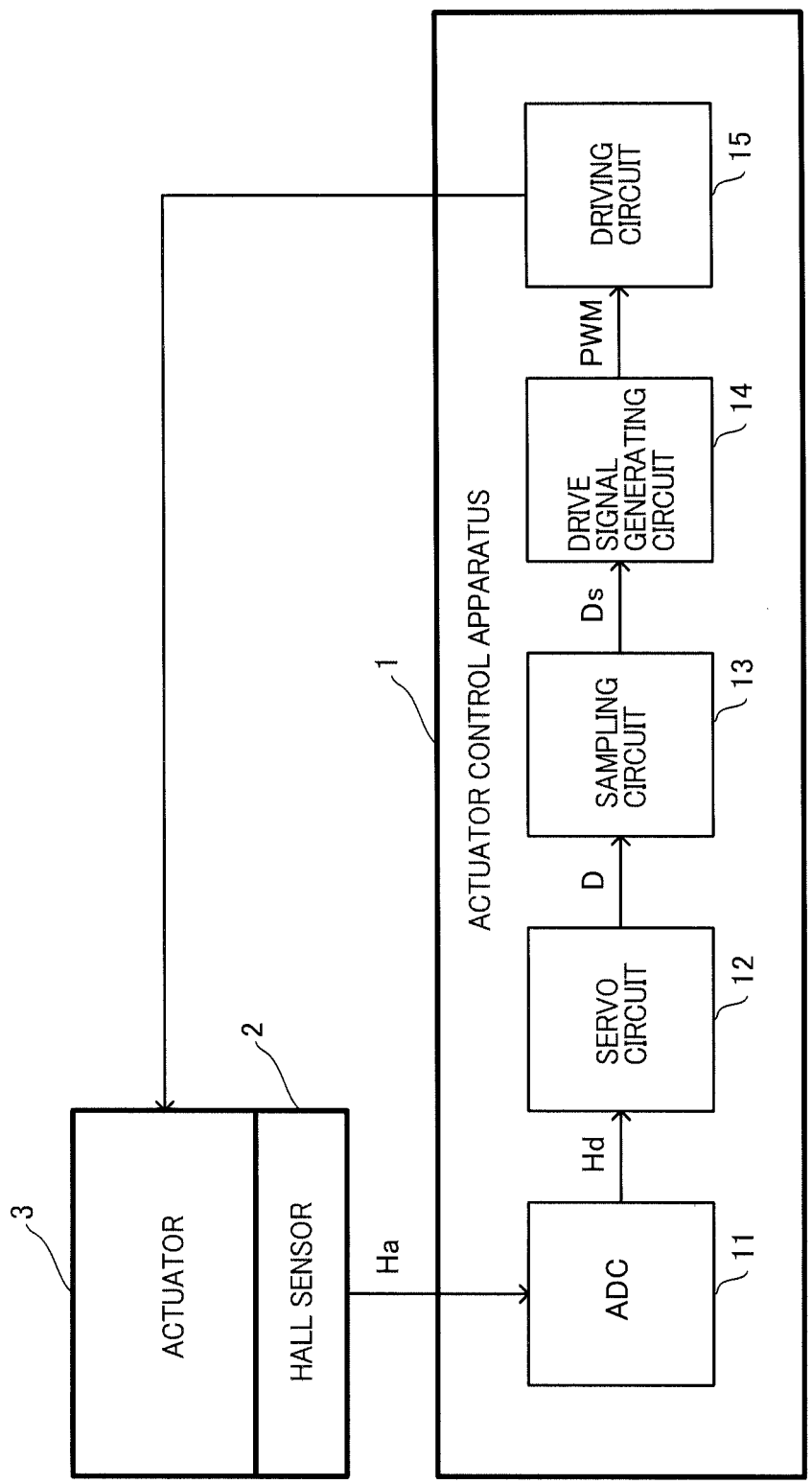
FIG. 1 is a block diagram illustrating a configuration of an actuator control apparatus according to first to third embodiments of the present invention.

The actuator control apparatus 1 illustrated in FIG. 1 is an apparatus configured to execute feedback control of a position of a control target by driving an actuator 3 based on an output signal of a hall sensor 2, and is used for positional control of a diaphragm mechanism for performing AE control, for example. The actuator control apparatus 1 includes an ADC 11, a servo circuit 12, a sampling circuit 13, a drive signal generating circuit 14, and a driving circuit 15.

The hall sensor 2 is used as a position sensor, and a position detection signal Ha outputted from the hall sensor 2 is inputted to the ADC 11. A position detection signal Hd obtained by converting the position detection signal Ha is inputted from the ADC 11 to the servo circuit 12.

Figure 2:
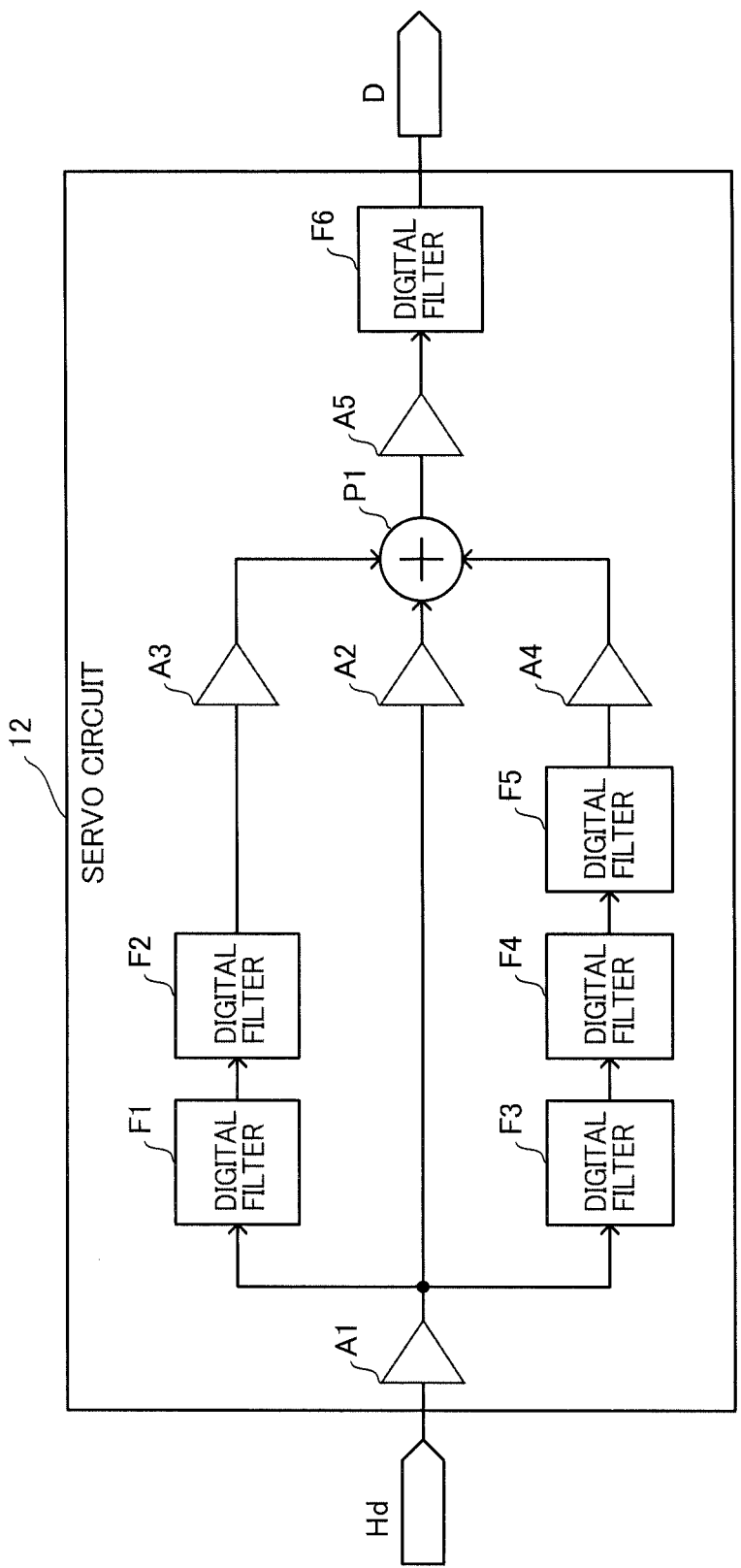
FIG. 2 is a circuit block diagram illustrating an example of a specific configuration of a servo circuit 12.

The servo circuit 12 is configured as a servo filter circuit including one or more digital filters as illustrated in FIG. 2, for example. The servo circuit 12 illustrated in FIG. 2 includes digital filters F1 to F6, multipliers A1 to A5, and an adder P1.

The position detection signal Hd is inputted to the multiplier A1, and an output signal of the multiplier A1 is inputted to the digital filters F1 and F3 and the multiplier A2. An output signal of the cascade-connected digital filters F1 and F2 and multiplier A3, an output signal of the cascade-connected digital filters F3 to F5 and multiplier A4, and an output signal of the multiplier A2 are inputted to the adder P1. The output signal of the adder P1 is inputted to the digital filter F6 through the multiplier A5, and (first) servo control data D is outputted from the digital filter F6.

The servo control data D outputted from the servo circuit 12 is inputted to the sampling circuit 13. From the sampling circuit 13 to the drive signal generating circuit 14, (second) servo control data Ds obtained by converting the servo control data D is inputted. A PWM signal outputted from the drive signal generating circuit 14 is inputted to the driving circuit 15 configured to drive the actuator 3.

===Configuration of Sampling Circuit===

A configuration of a sampling circuit according to an embodiment of the present invention will be described hereinafter referring to FIG. 3.

Figure 3:
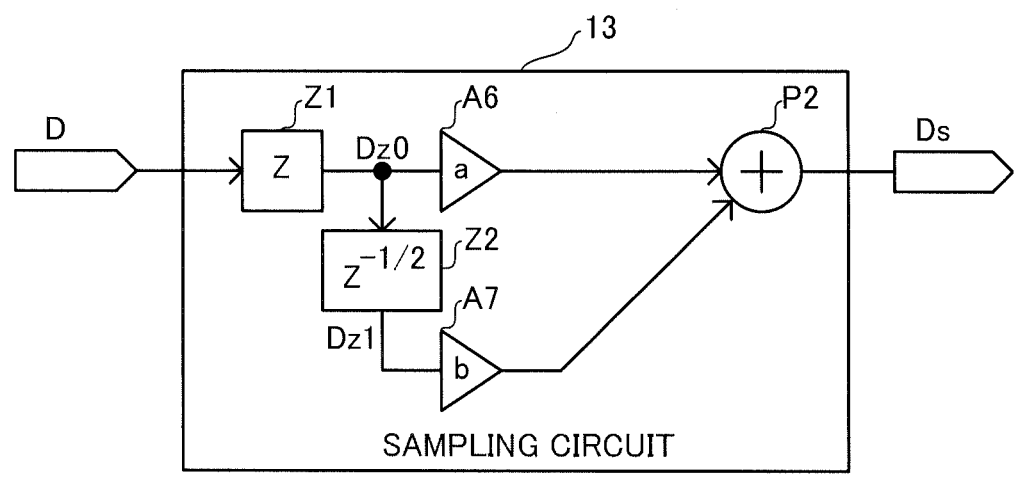
FIG. 3 is a circuit block diagram illustrating a configuration of a sampling circuit according to a first embodiment of the present invention.

The sampling circuit 13 illustrated in FIG. 3 includes delay devices Z1 and Z2, multipliers A6 and A7, and an adder P2.

The servo control data D is inputted to the delay device Z1, and an output signal Dz0 of the delay device Z1 is inputted to the (first) delay device Z2 and the (first) multiplier A6. An output signal Dz1 of the delay device Z2 is inputted to the (second) multiplier A7. Output signals of the multipliers A6 and A7 are inputted to the adder P2, and the servo control data Ds is outputted from the adder P2.

==Operation of Actuator Control Apparatus==

An operation of the actuator control apparatus according to an embodiment of the present invention will be described hereinafter referring to FIGS. 4 and 5 as appropriate.

The hall sensor 2 is configured to output a position detection signal Ha, which is an analog signal, in accordance with a position of a control target (diaphragm mechanism). The ADC 11 is configured to sample the position detection signal Ha with a (first) sampling period T (=1/fs), convert sampled signal into a position detection signal Hd, which is a digital signal, and output the digital signal.

The servo circuit 12 is configured to calculate a displacement amount by which the control target is displaced by the actuator 3, and output servo control data D corresponding to the calculated displacement amount, based on the position detection signal Hd. Such servo control data D corresponding to the position detection signal Hd is, as illustrated in FIG. 2, for example, generated by a filter circuit configured by combining a digital filter, a multiplier, an adder and the like. Data such as a target value of a diaphragm position is inputted, as appropriate, from an AE control unit, which is included in an image pickup device, to the servo circuit 12, for example.

The sampling circuit 13 configured to linearly interpolate the servo control data D, and output servo control data Ds sampled with a (second) sampling period shorter than the sampling period T. In an embodiment of the present invention, by way of example, the servo control data Ds sampled with a sampling period T/2 (½ times as long as the sampling period T) is outputted. An operation of the sampling circuit 13 according to an embodiment of the present invention is illustrated in FIG. 4.

Figure 4:
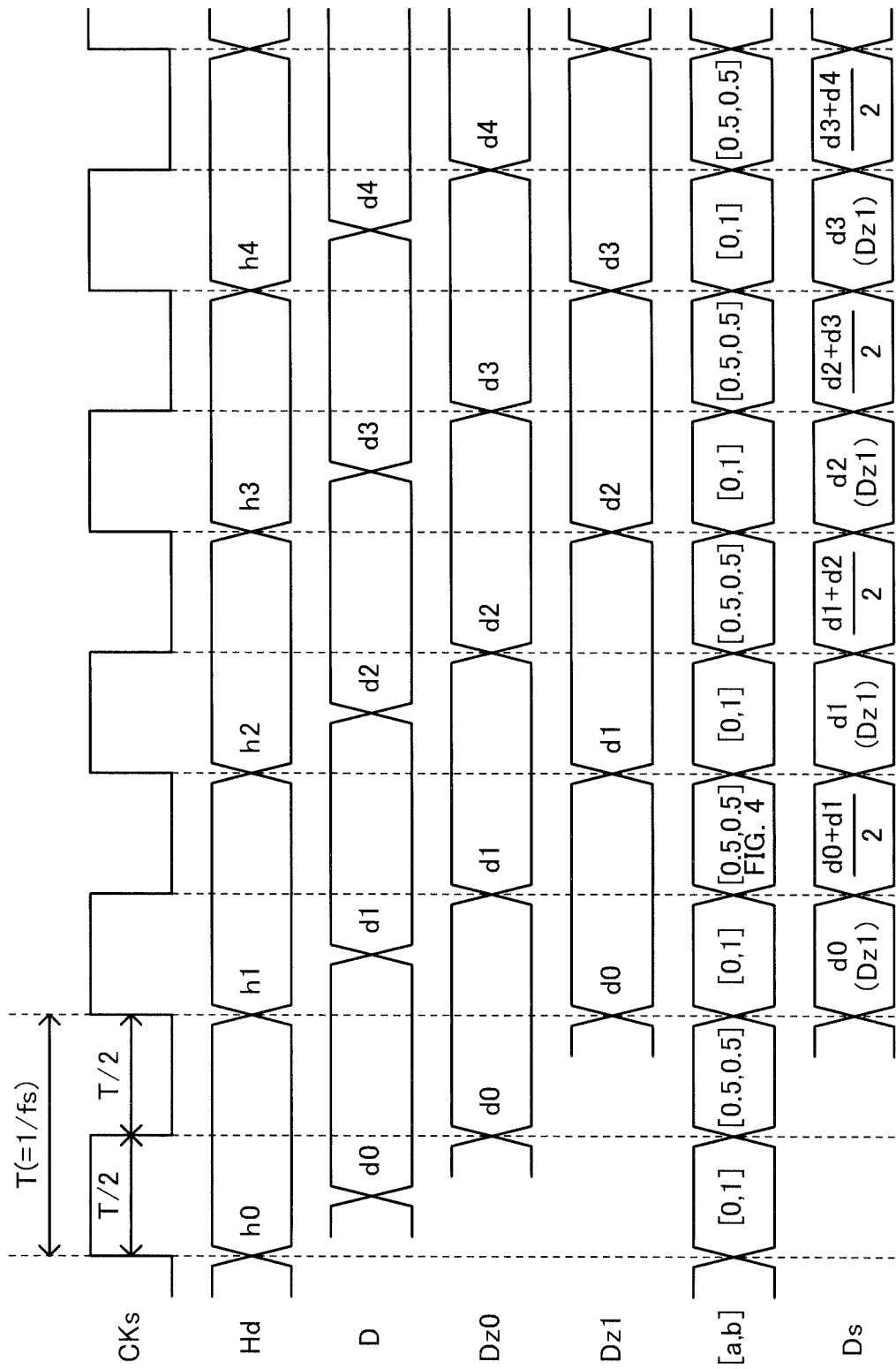
FIG. 4 is a diagram for describing an operation of a sampling circuit according to a first embodiment of the present invention.

In FIG. 4, the position detection signal Hd is sampled at a rising edge of a sampling clock CKs of the ADC 11, and the servo control data D is delayed by the processing time of the servo circuit 12 with respect to the position detection signal Hd. It is assumed here that the servo control data D is synchronized with neither a raising edge nor a falling edge of the sampling clock CKs, and a delay device Z1 outputs data Dz0 synchronized with either one of the edges (falling edge in FIG. 4) by delaying the servo control data D.

The delay device Z2 is configured to output data Dz1 obtained by delaying the data Dz0 by the sampling period T/2. The multiplier A6 is configured to output a value obtained by multiplying the data Dz0 by a (first) coefficient a, and the multiplier A7 is configured to output a value obtained by multiplying the data Dz1 by a (second) coefficient b. The adder P2 is configured to add the output values of the multiplier A6 and A7, and output such a result as the servo control data Ds.

The coefficient a of the multiplier A6 is switched in an alternate manner between 0 and 0.5 every sampling period T/2, and the coefficient b of the multiplier A7 is 1 when a=0 and is 0.5 when a=0.5. In FIG. 4, while the sampling clock CKs is high, the coefficients a and b are 0 and 1, respectively, and while the sampling clock CKs is low, both of them are 0.5. Thus, while the sampling clock CKs is high, the data Dz1 (=Dz0) is outputted from the adder P2, and while the sampling clock CKs is low, an average value (Dz1+Dz0)/2 of the data Dz1 and Dz0 is outputted therefrom.

As such, the sampling circuit 13 according to an embodiment of the present invention is configured to output, as the servo control data Ds, the servo control data D and the average value of the two contiguous pieces of data of the servo control data D in an alternate manner every sampling period T/2. Thus, the servo control data Ds results in a value obtained by linearly interpolating the servo control data D and sampling such data with the sampling period T/2.

In FIG. 4, since the servo control data D is delayed with respect to the position detection signal Hd by a time period shorter than the sampling period T/2, the data Dz0 outputted from the delay device Z1 is synchronized with the falling edge of the sampling clock CKs, but it is not limited thereto. If the data Dz0 is synchronized with the rising edge of the sampling clock CKs, it is only necessary that the coefficient a of the multiplier A6 and the coefficient b of the multiplier A7 are set at 0 and 1, respectively, while the sampling clock CKs is low, and both of them are set at 0.5 while the sampling clock CKs is high.

Figure 5:
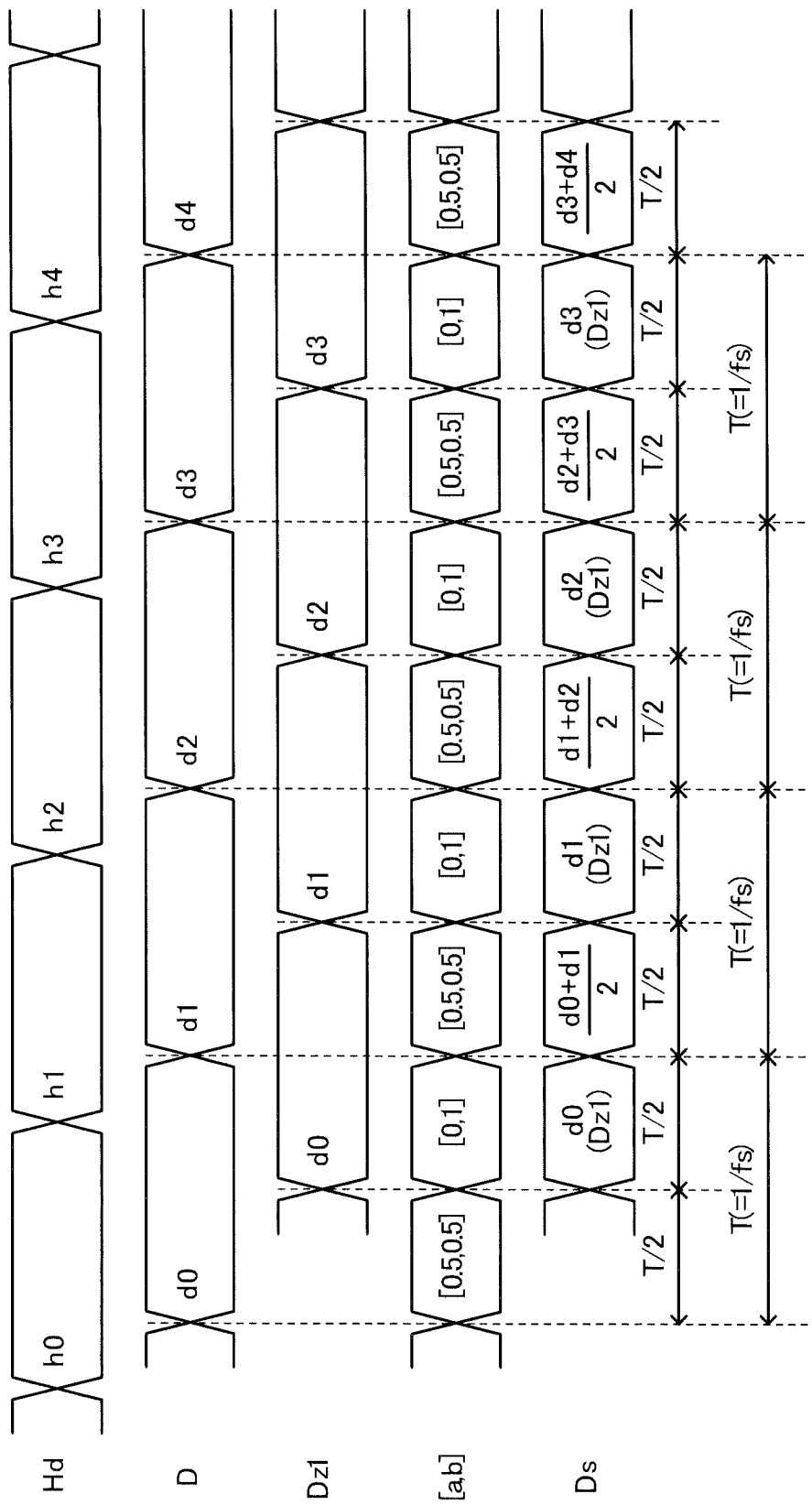
FIG. 5 is a diagram for explaining another operation of a sampling circuit according to a first embodiment of the present invention.

If the delay time with respect to the position detection signal Hd of the servo control data D is constant, the servo control data D changes with a period equal to the sampling period T, and thus the sampling circuit may be configured so as to be synchronized with change timing of the servo control data D, as illustrated in FIG. 5, for example. In this case, the delay device Z1 for synchronizing the servo control data D with the sampling clock CKs is not needed.

The drive signal generating circuit 14 is configured to generate a PWM signal based on the servo control data Ds, and the driving circuit 15 is configured to drive the actuator 3 in accordance with the PWM signal. And position control is performed for the control target with feedback control as described above.

As such, the actuator control apparatus 1 according to an embodiment of the present invention is configured to linearly interpolate the (first) servo control data D generated from the position detection signal Hd, and generate the (second) servo control data Ds sampled with the (second) sampling period T/2, which is shorter than the (first) sampling period T when the position detection signal Ha, which is an analog signal, is converted into the position detection signal Hd, which is a digital signal. Then, the actuator control apparatus 1 drives the actuator 3 based on the servo control data Ds, and performs feedback-control of the position of the control target (diaphragm mechanism).

Thus, since the actuator 3 can be driven based on the servo control data Ds equivalent to that in the case where the sampling frequency fs of the ADC 11 is doubled, the sampling frequency fs is increased higher than the audible range, thereby being able to suppress the driving noise of the actuator 3 in the audible range. Thus, circuit scale and power consumption can be suppressed without the increasing speeds of the ADC 11 and the servo circuit 12.

Second Embodiment

Configuration of Sampling Circuit

A configuration of a sampling circuit according to a second embodiment of the present invention will be described hereinafter referring to FIG. 6. The configuration of the actuator control apparatus 1 according to this embodiment of the present invention is similar to that of the actuator control apparatus 1 according to a first embodiment of the present invention except the configuration of the sampling circuit 13.

Figure 6:
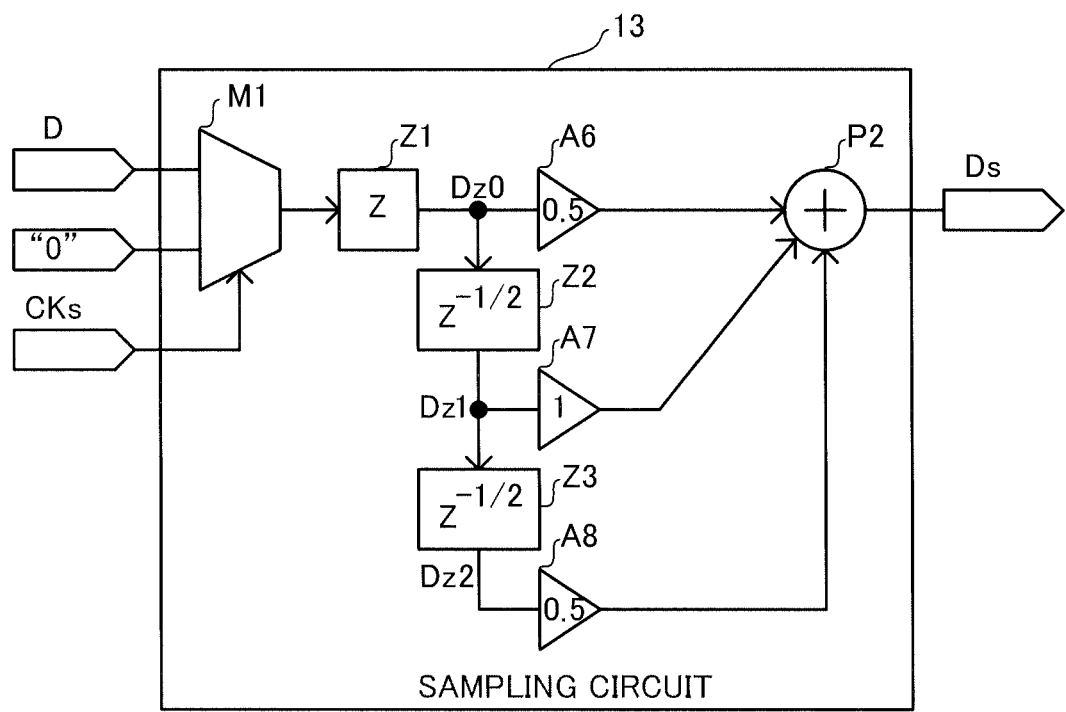
FIG. 6 is a circuit block diagram illustrating a configuration of a sampling circuit according to a second embodiment of the present invention.

The sampling circuit 13 illustrated in FIG. 6 includes a multiplexer M1, the delay devices Z1 to Z3, the multipliers A6 to A8, and the adder P2.

The servo control data D is inputted to one of the data inputs of the multiplexer M1, and the value "0" is inputted to the other data input all the time. The sampling clock CKs is inputted to a selection input of the multiplexer M1, and the output signal of the multiplexer M1 is inputted to the delay device Z1.

The output signal Dz0 of the delay device Z1 is inputted to the (first) delay device Z2 and the multiplier A6. The output signal Dz1 of the delay device Z2 is inputted to the (second) delay device Z3 and the multiplier A7. Further, the output signal Dz2 of the delay device Z3 is inputted to the multiplier A8. The output signals of the multipliers A6 to A8 are inputted to the adder P2, and the servo control data Ds is outputted from the adder P2.

===Operation of Sampling Circuit===

An operation of the sampling circuit according to an embodiment of the present invention will be described hereinafter referring to FIGS. 7 and 8 as appropriate. The operation of the actuator control apparatus 1 according to this embodiment of the present invention is similar to that of the actuator control apparatus 1 according to a first embodiment of the present invention except an operation of the sampling circuit 13.

Figure 7:
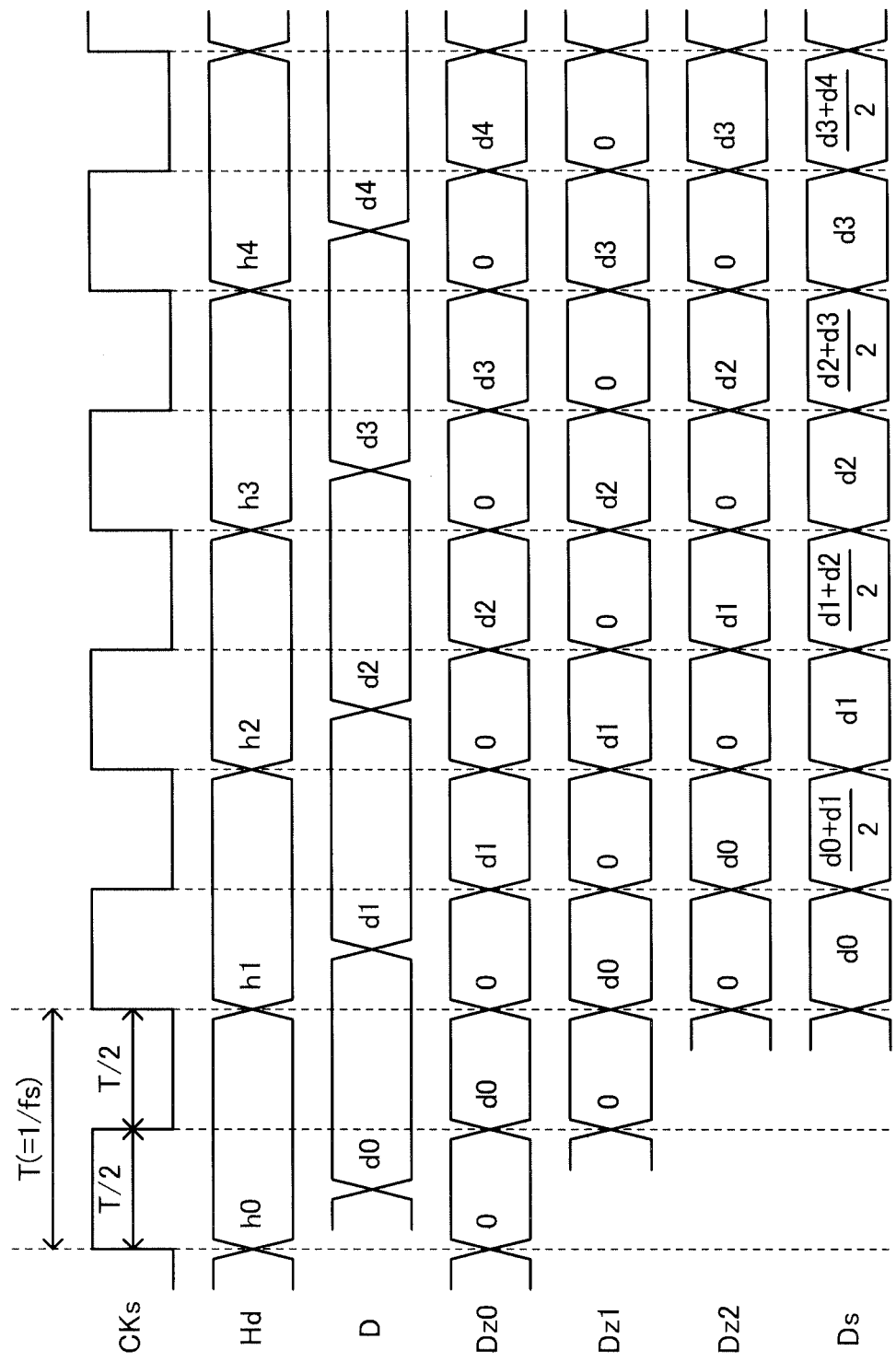
FIG. 7 is a diagram for describing an operation of a sampling circuit according to a second embodiment of the present invention.
Figure 8:
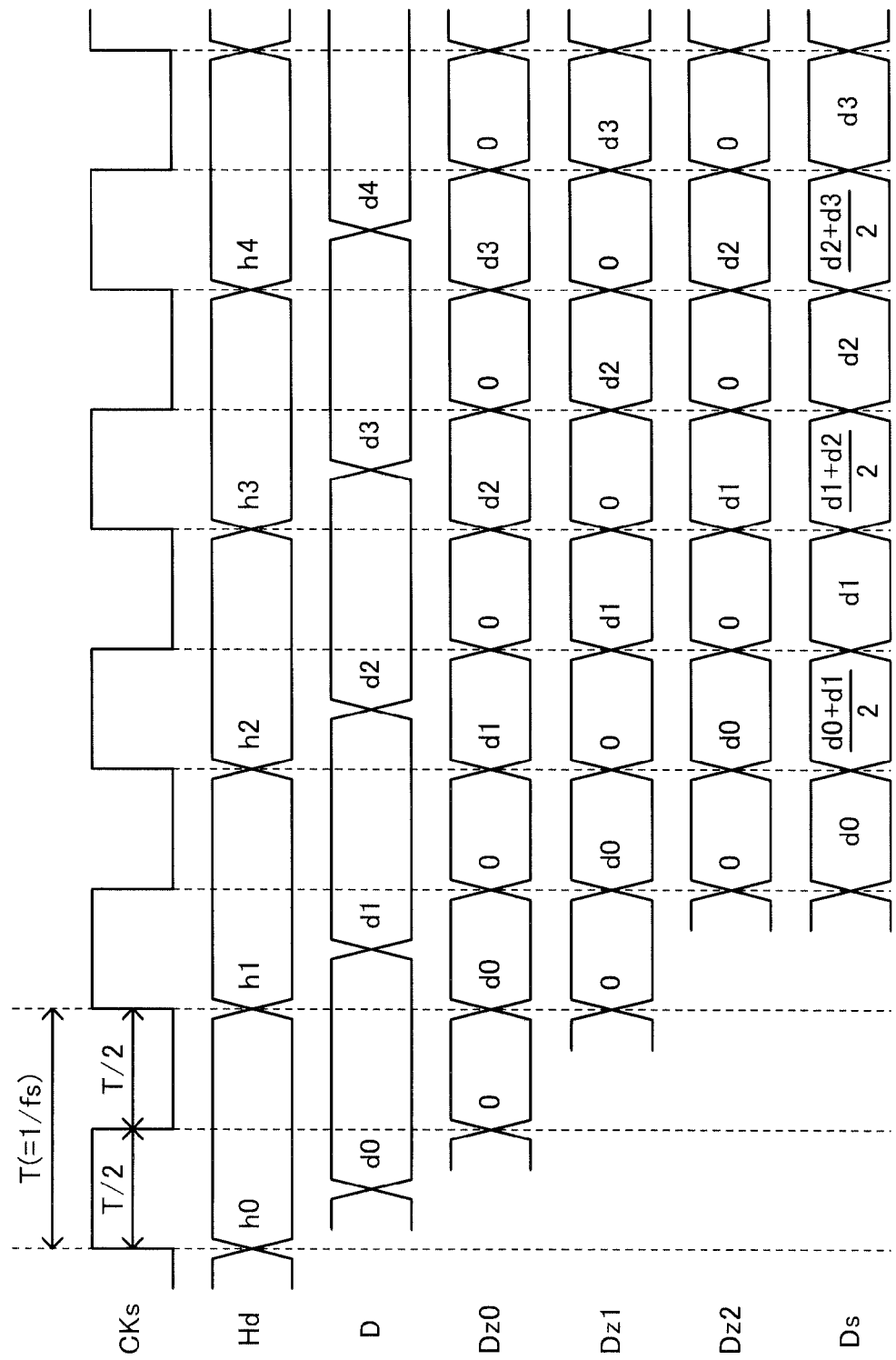
FIG. 8 is a diagram for describing another operation of a sampling circuit according to a second embodiment of the present invention.

In FIG. 7, change timings of the sampling clock CKs, the position detection signal Hd, and the servo control data D are similar to those in FIG. 4. It is assumed here that the multiplexer M1 outputs the servo control data D when the selection input is high and outputs the value "0" when the selection input is low, and the delay device Z1 delays the output signal of the multiplexer M1 and outputs the data Dz0 synchronized with both the edges (rising edge and falling edge) of the sampling clock CKs. Thus, the multiplexer M1 and the delay device Z1 correspond to a selection circuit that is configured to select and output the servo control data D and the value "0" in an alternate manner every sampling period T/2.

The delay device Z2 is configured to output the data Dz1 obtained by delaying the data Dz0 by the sampling period T/2, and the delay device Z3 is configured to output the data Dz2 obtained by delaying the data Dz1 by the sampling period T/2. The multiplier A6 is configured to output a value obtained by multiplying the data Dz0 by a coefficient of "0.5", the multiplier A7 is configured to output a value obtained by multiplying the data Dz1 by a coefficient of "1", and the multiplier A8 is configured to output a value obtained by multiplying the data Dz2 by a coefficient of "0.5". Then, the adder P2 is configured to add the output values of the multipliers A6 to A8, to be output resulted as the servo control data Ds. Thus, as illustrated in FIG. 7, the data Dz1 is outputted while the sampling clock CKs is high, and an average value (Dz2+Dz0)/2 of the data Dz2 and Dz0 is outputted while the sampling clock CKs is low.

As such, the sampling circuit 13 according to an embodiment of the present invention outputs, as the servo control data Ds, the servo control data D and the average value of the two contiguous pieces of data of the servo control data D in an alternate manner every sampling period T/2, similarly to the sampling circuit 13 according to a first embodiment of the present invention.

In FIG. 7, a configuration is such that the value "0" is outputted from the multiplexer M1 when the selection input is low, but it is not limited thereto. As illustrated in FIG. 8, even if the configuration is such that the value "0" is outputted from the multiplexer M1 when the selection input is high, the sampling circuit 13 according to an embodiment of the present invention outputs, as the servo control data Ds, the servo control data D and the average value of the two contiguous pieces of data of the servo control data D in an alternate manner every sampling period T/2.

Third Embodiment

Operation of Sampling Circuit

Figure 9:
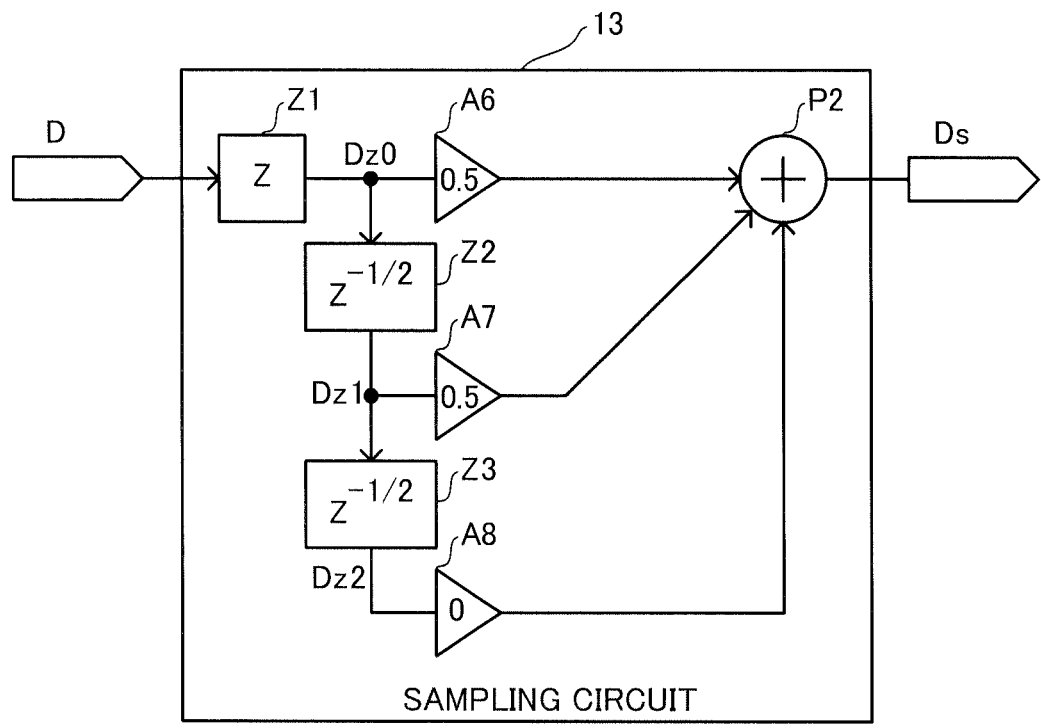
FIG. 9 is a circuit block diagram illustrating a configuration of a sampling circuit according to a third embodiment of the present invention.

In the sampling circuit 13 according to a second embodiment of the present invention, the value "0" is inserted to the servo control data D every sampling period T/2 using the multiplexer M1, but a configuration without the multiplexer M1 is possible by changing the coefficients of the multipliers A6 to A8. FIG. 9 illustrates a configuration of the sampling circuit according to a third embodiment of the present invention in which the multiplexer M1 is eliminated in the sampling circuit 13 according to a second embodiment of the present invention illustrated in FIG. 6. The configuration of the actuator control apparatus 1 according to this embodiment of the present invention is similar to that of the actuator control apparatus 1 according to first and second embodiments except the configuration of the sampling circuit 13.

An operation of the sampling circuit according to an embodiment of the present invention will be described hereinafter referring to FIGS. 10 and 11 as appropriate. The operation of the actuator control apparatus 1 according to this embodiment of the present invention is similar to that of the actuator control apparatus 1 according to a first embodiment of the present invention except the operation of the sampling circuit 13.

Figure 10:
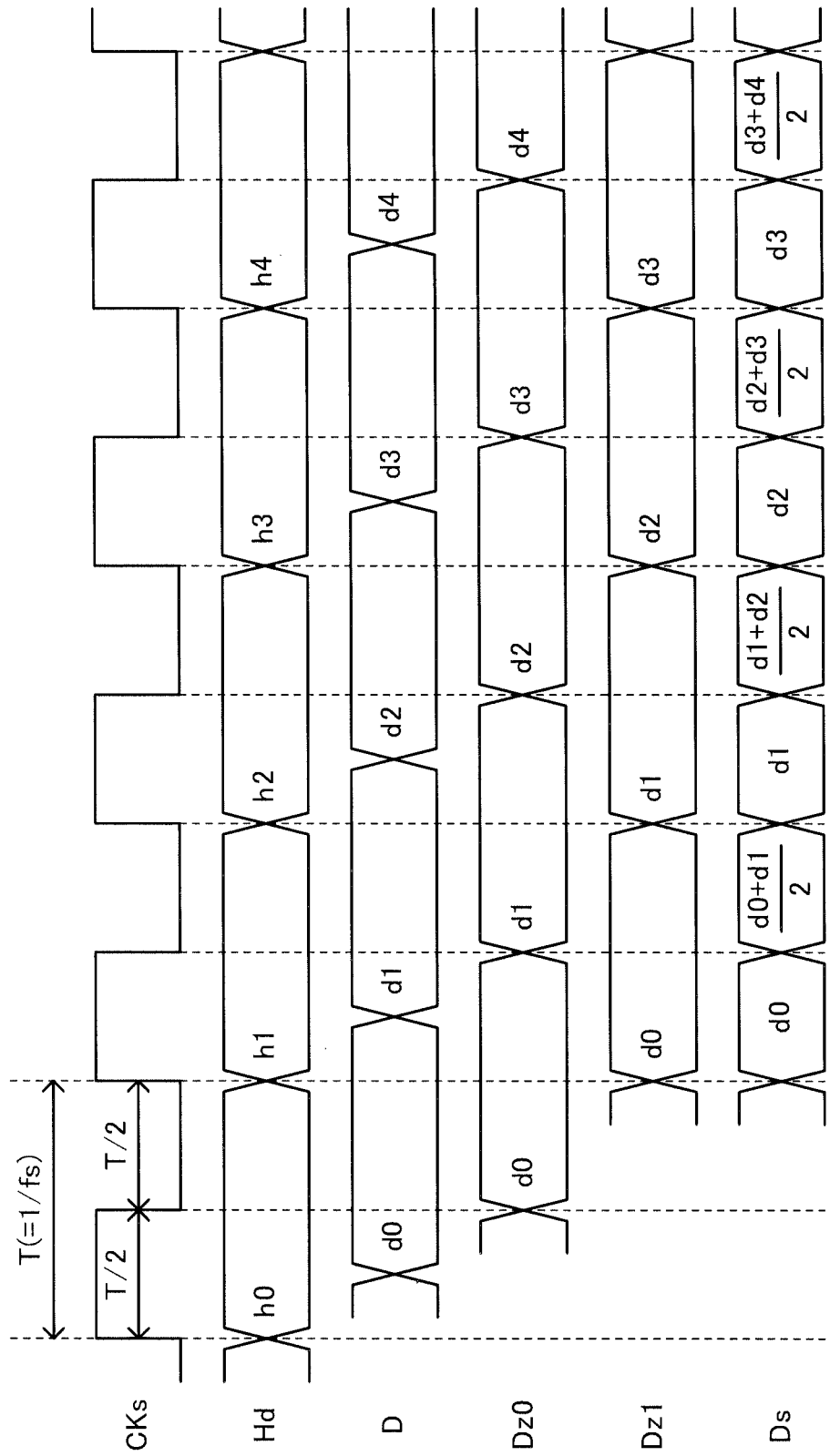
FIG. 10 is a diagram for describing an operation of a sampling circuit according to a third embodiment of the present invention.

In FIG. 10, change timings of the sampling clock CKs, the position detection signal Hd, the servo control data D, and the data Dz0 are similar to those in FIG. 4.

The (first) delay device Z2 is configured to output the data Dz1 obtained by delaying the data Dz0 by the sampling period T/2, and the delay device Z3 is configured to output the data Dz2 obtained by delaying the data Dz1 by the sampling period T/2. The multiplier A6 is configured to output a value obtained by multiplying the data Dz0 by a coefficient of "0.5", the multiplier A7 is configured to output a value obtained by multiplying the data Dz1 by a coefficient of "0.5", and the multiplier A8 is configured to output a value obtained by multiplying the data Dz2 by a coefficient of "0". Then, the adder P2 is configured to add the output values of the multipliers A6 to A8, and output such a result as the servo control data Ds. Thus, as illustrated in FIG. 10, the data Dz1 (=Dz0) is outputted from the adder P2 while the sampling clock CKs is high, and the average value (Dz1+Dz0)/2 of the data Dz1 and Dz0 is outputted while the sampling clock CKs is low.

As such, the sampling circuit 13 according to an embodiment of the present invention outputs, as the servo control data Ds, the servo control data D and the average value of the two contiguous pieces of data of the servo control data D in an alternate manner every sampling period T/2, similarly to the sampling circuit 13 according to first and second embodiments of the present invention.

In an embodiment of the present invention, since the coefficient of the multiplier A8 is "0", the delay device Z3 and the multiplier A8 can be eliminated. In this case, the configuration of the sampling circuit 13 according to an embodiment of the present invention becomes similar to that of the sampling circuit 13 according to a first embodiment of the present invention illustrated in FIG. 3 except the coefficients of the multipliers A6 and A7.

Further, in FIG. 10, similarly to FIG. 4, a configuration is such that the data Dz0 outputted from the delay device Z1 is synchronized with the falling edge of the sampling clock CKs, but it is not limited thereto. Even if the configuration is such that the data Dz0 is synchronized with the rising edge of the sampling clock CKs, the sampling circuit 13 according to an embodiment outputs, as servo control data Ds, the servo control data D and the average value of the two contiguous pieces of data of the servo control data ID in an alternate manner every sampling period T/2.

Figure 11:
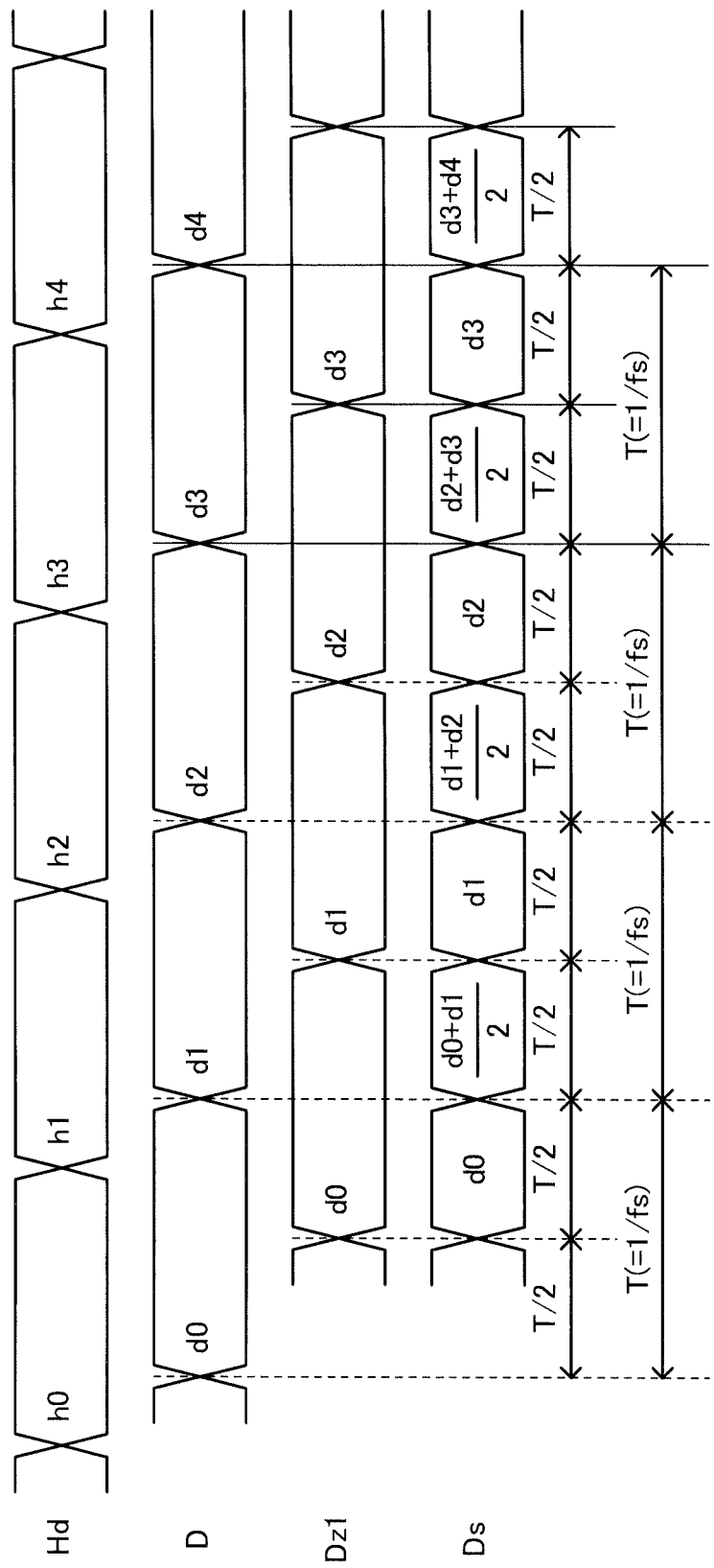
FIG. 11 is a diagram for describing another operation of a sampling circuit according to a third embodiment of the present invention.

If the delay time with respect to the position detection signal Hd of the servo control data D is constant, the servo control data D changes with a period equal to the sampling period T, and thus the sampling circuit may be configured to be synchronized with change timing of the servo control data ID, as illustrated in FIG. 11, for example. In this case, the delay device Z1 for synchronizing the servo control data D with the sampling clock CKs is not needed.

As described above, in the actuator control apparatus 1 illustrated in FIG. 1, since the (first) servo control data D generated from the position detection signal Hd is linearly interpolated, the (second) servo control data Ds sampled with the (second) sampling period T/2 shorter than the (first) sampling period T in the ADC 11 is generated, and the actuator 3 is driven in accordance with the servo control data Ds, thereby being able to drive the actuator 3 in accordance with the servo control data Ds equivalent to that in the case where the sampling frequency fs of the ADC 11 is increased, and thus the driving noise of the actuator 3 in the audible range can be suppressed while the circuit scale and power consumption of the ADC 11 and the servo circuit 12 and the like are suppressed.

Further, in the sampling circuits 13 illustrated in FIGS. 3, 6, and 9, the servo control data D and the average value of the two contiguous pieces of data of the servo control data D are outputted in an alternate manner as the servo control data Ds every sampling period T/2, thereby being able to drive the actuator 3 in accordance with the servo control data Ds equivalent to that in the case where the sampling frequency fs of the ADC 11 is doubled, and thus the sampling frequency fs is increased higher than the audible range, thereby being able to suppress the driving noise of the actuator 3 in the audible range.

Further, in the sampling circuit 13 illustrated in FIG. 6, the value obtained by multiplying the data Dz0, for which the servo control data D and the value "0" are selected in an alternate manner every sampling period T/2, by 0.5; the data Dz1 obtained by delaying the data Dz0 by the sampling period T/2; and the value obtained by multiplying the data Dz2, which is obtained by delaying the data Dz1 by the sampling period T/2, by 0.5, are added together, thereby being able to output, as the servo control data Ds, the servo control data ID and the average value of the two contiguous pieces of data of the servo control data ID in an alternate manner every sampling period T/2.

Further, in the sampling circuit 13 illustrated in FIG. 3, the value obtained by multiplying the data Dz0 by the (first) coefficient a and the value obtained by multiplying the data Dz1, which is obtained by delaying the data Dz0 by the sampling period T/2, by the (second) coefficient b are added together; the coefficient a is switched in an alternate manner between 0 and 0.5 every sampling period T/2; and the coefficient b is set at 1 if a=0 and set at 0.5 if a=0.5, thereby being able to output, as the servo control data Ds, the servo control data D and the average value of the two contiguous pieces of data of the servo control data ID in an alternate manner every sampling period T/2.

Further, in the sampling circuit 13 illustrated in FIG. 9, the value obtained by multiplying the data Dz0 by 0.5 and the value obtained by multiplying the data Dz1, which is obtained by delaying the data Dz0 by the sampling period T/2, by 0.5 are added together, thereby being able to output, as the servo control data Ds, the servo control data D and the average value of the two contiguous pieces of data of the servo control data ID in an alternate manner every sampling period T/2.

Further, the actuator control apparatus 1 is used to perform the position control of the diaphragm mechanism with feedback control based on the position detection signal Ha outputted from the hall sensor 2, thereby being able to perform AE control of the image pickup device and the like.

The above embodiments of the present invention are simply for facilitating the understanding of the present invention and are not in any way to be construed as limiting the present invention. The present invention may variously be changed or altered without departing from its spirit and encompasses equivalents thereof.

What is claimed is:

1. An actuator control apparatus comprising:
    an analog-digital conversion circuit configured to sample a position detection signal with a first sampling period, convert the sampled signal into a digital signal, and output the digital signal, the position detection signal outputted from a position sensor corresponding to a position of a control target;
    a servo circuit configured to calculate a displacement amount, by which the control target is to be displaced by an actuator, and output first servo control data corresponding to the calculated displacement amount, based on the position detection signal converted into the digital signal, the servo circuit comprising:
        a first multiplier having an input and an output;

a first digital filter having an input and an output and a second digital filter having an input and an output, the input of the first digital filter coupled to the output of the first multiplier and the output of the first digital filter coupled to the output of the second digital filter;

a third digital filter having an input and an output, a fourth digital filter having an input and an output, and a fifth digital filter having an input and an output, the input of the third digital filter coupled to the output of the first multiplier and the output of the fourth digital filter coupled to the output of the third digital filter;

a second multiplier having an input and an output, the input of the second multiplier coupled to the output of the first multiplier;

a third multiplier having an input and an output, the input of the third multiplier coupled to the output of the second digital filter;

a fourth multiplier having an input and an output, the input of the fourth multiplier coupled to the output of the fifth digital filter;

a summer having a first input, a second input, a third input, and an output, the first input of the summer coupled to the output of the second multiplier, the second input of the summer coupled to the output of the third multiplier, and the third input of the summer coupled to the output of the fourth multiplier;

a fifth multiplier having an input and an output, the input of the sixth multiplier coupled to the output of the summer; and a sixth digital filter having an input and an output, the input of the sixth digital filter coupled to the output of the fifth multiplier;

a sampling circuit configured to linearly interpolate the first servo control data, and output second servo control data sampled with a second sampling period shorter than the first sampling period; and a driving circuit configured to drive the actuator in accordance with the second servo control data.

2. The actuator control apparatus according to claim 1, wherein the control target is a diaphragm mechanism of an image pickup device, and the position sensor is a hall sensor.

3. An actuator control apparatus, comprising:
an analog-digital conversion circuit configured to sample a position detection signal with a first sampling period, convert the sampled signal into a digital signal, and output the digital signal, the position detection signal outputted from a position sensor corresponding to a position of a control target;

a servo circuit configured to calculate a displacement amount, by which the control target is to be displaced by an actuator, and output first servo control data corresponding to the calculated displacement amount, based on the position detection signal converted into the digital signal;

a sampling circuit configured to linearly interpolate the first servo control data, and output second servo control data sampled with a second sampling period shorter than the first sampling period, wherein the second sampling period is ½ times as long as the first sampling period; and the sampling circuit is further configured to output, as the second servo control data, the first servo control data and an average value of two contiguous pieces of data of the first servo control data in an alternate manner every second sampling period; and a driving circuit configured to drive the actuator in accordance with the second servo control data.

4. The actuator control apparatus according to claim 3, wherein the sampling circuit includes a selection circuit configured to select and output the first servo control data and a value of 0 in an alternate manner every second sampling period, a first delay device configured to delay an output value of the selection circuit by the second sampling period, a second delay device configured to delay an output value of the first delay device by the second sampling period, and an adder configured to add a value obtained by multiplying an output value of the selection circuit by 0.5, an output value of the first delay device, and a value obtained by multiplying an output value of the second delay device by 0.5, and output a result as the second servo control data.

5. The actuator control apparatus according to claim 4, wherein the control target is a diaphragm mechanism of an image pickup device, and the position sensor is a hall sensor.

6. The actuator control apparatus according to claim 3, wherein the sampling circuit includes a first delay device configured to delay the first servo control data by the second sampling period, a first multiplier configured to multiply the first servo control data by a first coefficient, a second multiplier configured to multiply an output value of the first delay device by a second coefficient, and an adder configured to add an output value of the first multiplier and an output value of the second multiplier, and output a result as the second servo control data, and wherein the first coefficient is switched in an alternate manner between 0 and 0.5 every second sampling period, and the second coefficient is 1 when the first coefficient is 0, and is 0.5 when the first coefficient is 0.5.

7. The actuator control apparatus according to claim 6, wherein the control target is a diaphragm mechanism of an image pickup device, and the position sensor is a hall sensor.

8. The actuator control apparatus according to claim 3, wherein the sampling circuit includes a first delay device configured to delay the first servo control data by the second sampling period, and an adder configured to add a value obtained by multiplying the first servo control data by 0.5, and a value obtained by multiplying an output value of the first delay device by 0.5, and output a result as the second servo control data.

9. The actuator control apparatus according to claim 8, wherein the control target is a diaphragm mechanism of an image pickup device, and the position sensor is a hall sensor.

10. The actuator control apparatus according to claim 3, wherein the control target is a diaphragm mechanism of an image pickup device, and the position sensor is a hall sensor.

11. An image pickup device comprising:
a position sensor configured to output a position detection signal, which is an analog signal, corresponding to a position of diaphragm blades;

an analog-digital conversion circuit configured to sample the position detection signal with a first sampling period, convert the sampled signal into a digital signal, and output the digital signal;

a servo circuit configured to calculate a displacement amount, by which the diaphragm blades are to be displaced by an actuator, and output first servo control data corresponding to the calculated displacement amount, based on the position detection signal converted into the digital signal, the servo circuit comprising:
a first multiplier having an input and an output;
a first digital filter having an input and an output and a second digital filter having an input and an output, the input of the first digital filter coupled to the output of the first multiplier and the output of the first digital filter coupled to the output of the second digital filter;

a third digital filter having an input and an output, a fourth digital filter having an input and an output, and a fifth digital filter having an input and an output, the input of the third digital filter coupled to the output of the first multiplier and the output of the fourth digital filter coupled to the output of the third digital filter;

a second multiplier having an input and an output, the input of the second multiplier coupled to the output of the first multiplier;

a third multiplier having an input and an output, the input of the third multiplier coupled to the output of the second digital filter;

a fourth multiplier having an input and an output, the input of the fourth multiplier coupled to the output of the fifth digital filter;

a summer having a first input, a second input, a third input, and an output, the first input of the summer coupled to the output of the second multiplier, the second input of the summer coupled to the output of the third multiplier, and the third input of the summer coupled to the output of the fourth multiplier;

a fifth multiplier having an input and an output, the input of the sixth multiplier coupled to the output of the summer; and a sixth digital filter having an input and an output, the input of the sixth digital filter coupled to the output of the fifth multiplier;

a sampling circuit configured to linearly interpolate the first servo control data, and output second servo control data sampled with a second sampling period shorter than the first sampling period; and a driving circuit configured to drive the actuator in accordance with the second servo control data.

12. An image pickup device, comprising:

a position sensor configured to output a position detection signal, which is an analog signal, corresponding to a position of diaphragm blades;

an analog-digital conversion circuit configured to sample the position detection signal with a first sampling period, convert the sampled signal into a digital signal, and output the digital signal;

a servo circuit configured to calculate a displacement amount, by which the diaphragm blades are to be displaced by an actuator, and output first servo control data corresponding to the calculated displacement amount, based on the position detection signal converted into the digital signal;

a sampling circuit configured to linearly interpolate the first servo control data, and output second servo control data sampled with a second sampling period shorter than the first sampling period, wherein the second sampling period is ½ times as long as the first sampling period; and the sampling circuit is further configured to output, as the second servo control data, the first servo control data and an average value of two contiguous pieces of data of the first servo control data in an alternate manner every second sampling period; and a driving circuit configured to drive the actuator in accordance with the second servo control data.

13. The image pickup device according to claim 12, wherein the sampling circuit includes a selection circuit configured to select and output the first servo control data and a value of 0 in an alternate manner every second sampling period, a first delay device configured to delay an output value of the selection circuit by the second sampling period, a second delay device configured to delay an output value of the first delay device by the second sampling period, and an adder configured to add a value obtained by multiplying an output value of the selection circuit by 0.5, an output value of the first delay device, and a value obtained by multiplying an output value of the second delay device by 0.5, and output a result as the second servo control data.

14. The image pickup device according to claim 12, wherein the sampling circuit includes a first delay device configured to delay the first servo control data by the second sampling period, a first multiplier configured to multiply the first servo control data by a first coefficient, a second multiplier configured to multiply an output value of the first delay device by a second coefficient, and an adder configured to add an output value of the first multiplier and an output value of the second multiplier, and output a result as the second servo control data, and wherein the first coefficient is switched in an alternate manner between 0 and 0.5 every second sampling period, and the second coefficient is 1 when the first coefficient is 0, and is 0.5 when the first coefficient is 0.5.

15. The image pickup device according to claim 12, wherein the sampling circuit includes a first delay device configured to delay the first servo control data by the second sampling period, and an adder configured to add a value obtained by multiplying the first servo control data by 0.5, and a value obtained by multiplying an output value of the first delay device by 0.5, and output a result as the second servo control data.

16. A method for controlling a diaphragm of an image pickup device, comprising:

detecting a position of diaphragm blades;

generating a position detection signal which is an analog signal;

converting the position detection signal sampled with a first sampling period into a digital signal;

calculating a displacement amount, by which the diaphragm blades are to be displaced by an actuator, based on the position detection signal converted into the digital signal;

generating first servo control data corresponding to the calculated displacement amount:

generating second servo control data sampled with a second sampling period shorter than the first sampling period, with the first servo control data being linearly interpolated, by selecting the first servo control data and an average value of two contiguous pieces of data of the first servo control data in an alternate manner every second sampling period, wherein the second sampling period is ½ times as long as the first sampling period; and driving the actuator in accordance with the second servo control data.

17. The method for controlling the diaphragm according to claim 16, further comprising:

generating selection data by selecting the first servo control data and a value of 0 in an alternate manner, every second sampling period;

generating first delay data obtained by delaying the selection data by the second sampling period;

generating second delay data by delaying the first delay data by the second sampling period; and generating the second servo control data by adding a value obtained by multiplying the selection data by 0.5, the first delay data, and a value obtained by multiplying the second delay data by 0.5.

18. The method for controlling the diaphragm according to claim 16, further comprising:
generating first delay data by delaying the first servo control data by the second sampling period;
calculating a first multiplication value by multiplying the first servo control data by a first coefficient;
calculating a second multiplication value by multiplying the first delay data by a second coefficient; and
generating the second servo control data by adding the first multiplication value and the second multiplication value, wherein the first coefficient is switched in an alternate manner between 0 and 0.5 every second sampling period, and the second coefficient is 1 when the first coefficient is 0, and is 0.5 when the first coefficient is 0.5.

19. The method for controlling the diaphragm according to claim 16, further comprising: generating a first delay data by delaying the first servo control data by the second sampling period, and generating the second servo control data by adding a value obtained by multiplying the first servo control data by 0.5, and a value obtained by multiplying the first delay data by 0.5.

20. The method for controlling the diaphragm according to claim 16, further comprising using a hall sensor to detect a position of diaphragm blades.

* * * * *